(12) United States Patent
Wieczorek et al.

(10) Patent No.: US 7,655,140 B2
(45) Date of Patent: Feb. 2, 2010

(54) AUTOMATIC WATER DRAIN FOR SUCTION FUEL WATER SEPARATORS

(75) Inventors: Mark T. Wieczorek, Cookeville, TN (US); Peter K. Herman, Cookeville, TN (US); Ricky England, Sparta, TN (US); Jean-Yves Picard, Quimper (FR); Benoit Le Roux, Fouesnant (FR); Jean-Luc Guichaoua, Combrit (FR)

(73) Assignee: Cummins Filtration IP Inc., Minneapolis, MN (US)

( * ) Notice: Subject to any disclaimer, the term of this patent is extended or adjusted under 35 U.S.C. 154(b) by 341 days.

(21) Appl. No.: 10/973,523

(22) Filed: Oct. 26, 2004

(65) Prior Publication Data

US 2006/0086649 A1    Apr. 27, 2006

(51) Int. Cl.
*F02M 37/22* (2006.01)
*B01D 17/02* (2006.01)

(52) U.S. Cl. .............. 210/120; 210/416.4; 210/167.31
(58) Field of Classification Search ................ 210/120, 210/416.4, 167.31
See application file for complete search history.

(56) References Cited

U.S. PATENT DOCUMENTS

| | | | |
|---|---|---|---|
| 1,504,006 A * | 8/1924 | Weaver | 116/272 |
| 2,215,697 A | 9/1940 | Hansen | |
| 2,399,994 A | 5/1946 | Feagin | |
| 2,997,180 A | 8/1961 | Loveday | |
| 3,019,904 A | 2/1962 | Stecher | |
| 3,550,776 A | 12/1970 | Hamilton | |
| 3,568,835 A | 3/1971 | Hansen | |
| 4,157,082 A | 6/1979 | Day | |
| 4,335,697 A | 6/1982 | McLean | |
| 4,491,143 A | 1/1985 | Yasuhara | |
| 4,637,351 A | 1/1987 | Pakula | |
| 4,799,504 A | 1/1989 | Scragg et al. | |

(Continued)

FOREIGN PATENT DOCUMENTS

DE    32 17 162 A1    11/1983

(Continued)

OTHER PUBLICATIONS

English Translation of DE3740804, Jun. 1989.*

(Continued)

*Primary Examiner*—Terry K Cecil
(74) *Attorney, Agent, or Firm*—Hamre, Schumann, Mueller & Larson, P.C.; J. Bruce Schelkopf

(57) ABSTRACT

A fuel water separator system includes a fuel tank for storing fuel and a fuel water separator fluidly coupled to the fuel tank for separating water from the fuel. A fuel pump has a suction side that is fluidly coupled to the fuel water separator for pumping fuel from the fuel water separator. The fuel pump has a high pressure side where the fuel has a higher pressure than at the suction side. A water pump, such as a venturi or a jet pump, is fluidly coupled between the fuel water separator and the fuel tank for pumping the water from the fuel water separator into the fuel tank. The water pump is fluidly coupled to the high pressure side of the fuel pump to receive the fuel at the higher pressure to drive the water pump.

18 Claims, 7 Drawing Sheets

U.S. PATENT DOCUMENTS

| | | | |
|---|---|---|---|
| 4,809,934 A | 3/1989 | Rix | |
| 4,846,967 A | 7/1989 | McGehee | |
| 4,933,093 A | 6/1990 | Keller | |
| 5,053,120 A | 10/1991 | Mollmann | |
| 5,078,901 A | 1/1992 | Sparrow | |
| 5,462,658 A | 10/1995 | Sem | |
| 5,462,679 A | 10/1995 | Verdegan et al. | |
| 5,788,859 A | 8/1998 | Biere | |
| 6,270,659 B1 | 8/2001 | Bagci et al. | |
| 6,435,142 B2 | 8/2002 | Harvey | |
| 6,444,119 B1 | 9/2002 | Mains, Jr. | |
| 2002/0170545 A1 | 11/2002 | Ekstam | |

FOREIGN PATENT DOCUMENTS

| | | | |
|---|---|---|---|
| DE | 37 40 804 C1 | | 7/1989 |
| DE | 3740804 C1 | * | 7/1989 |
| DE | 10302057 A1 | * | 7/2004 |
| EP | 0 278 755 A2 | | 8/1988 |
| EP | 0 806 564 A1 | | 11/1997 |
| EP | 0 800 708 B1 | | 2/2000 |
| GB | 2129329 A | * | 5/1984 |
| JP | 56006060 A2 | | 1/1981 |
| JP | 03105054 A | * | 5/1991 |
| WO | WO 96/20508 | | 7/1996 |

OTHER PUBLICATIONS

English Translation of DE10302057, Jul. 2004.*

Hanson, Blaine, Injection Devices for Fertigation, Department of Land, Air and Water Resources, University of California, Davis, 4 pages.

Pump Basics How A Centrifugal Pump Works, A.Y. McDonald Mfg. Co., Apr. 1998, 6 pages.

* cited by examiner

AUTOMATIC WATER DRAIN FOR SUCTION FUEL WATER SEPARATORS

BACKGROUND

The present invention generally relates to fuel water separator systems, and more specifically, but not exclusively, concerns a fuel water separator system in which water from fuel is automatically drained from a fuel water separator that is located on the suction side of a fuel pump in the system.

To protect fuel systems in engines, such as diesel engines, water must be removed from the fuel in order to reduce the risk of corrosion and poor performance in the engine and the other components, resulting from the water. Fuel water separators or filters are generally used to remove water from the fuel, but disposal of the separated water can be problematic. The water is usually stored in a relatively small pump or collection basin in the separator, and the water has to be manually drained through a valve. As a result of the relatively small size of the water pump, routine water drainage is typically conducted by the machine operator, such as a driver, at the beginning of each workday in order to reduce the risk of damage to the fuel system. Manual drainage of the water is not an easy task. Fuel water separators are sometimes located at locations that are generally not easy to access, which in turn makes manual drainage of water inconvenient. Due to environmental concerns as well as reliability reasons, some companies do not want the operator to be required to manually drain the water from the separator.

In response to this problem, automatic water drainage systems have been developed, but most current designs have significant drawbacks. Automatic drainage systems have been proposed that position the fuel water separator at the high pressure side or port of the fuel pump. The high pressure that exists in the fuel at the high pressure side can then be used to purge water from the separator. However, this high pressure fuel water separator design has a number of shortcomings. Typical fuel water separators perform optimally on the suction side (vacuum or low pressure) of the fuel pump. Further, it is desirable that fuel water separators are located on the suction side of the fuel pump so as to protect the fuel pump from damaging water in the fuel because the water in the fuel can create undesirable corrosion and cavitation in the fuel pump. Drainage of water from the suction side of the pump is made difficult by the vacuum that exists at the suction side of the fuel pump. Other types of systems have been developed in which the water is discharged into the air intake of an engine, such into a turbo charger. However, this reintroduction of water as well other contaminants into the air intake reduces the efficiency and life of the engine, and further creates environmental concerns. Additional systems have been developed in which electrical sensors and drain valves are used to drain the water, but since electrical systems tend to increase the number of failure modes, reliability is always a concern with these system. Thus, there is need for a system that automatically removes and drains water from the suction side of the fuel pump without the undesirable effects discussed above.

SUMMARY

One aspect of the present invention concerns a fuel water separator system. The fuel water separator system includes a fuel tank for storing fuel, and a fuel water separator is fluidly coupled to the fuel tank for separating water from the fuel. A fuel pump has a suction side that is fluidly coupled to the fuel water separator for pumping fuel from the fuel water separator. The fuel pump has a high pressure side where the fuel has a higher pressure than at the suction side. A water pump is fluidly coupled between the fuel water separator and the fuel tank for pumping the water from the fuel water separator into the fuel tank. The water pump is fluidly coupled to the high pressure side of the fuel pump to receive the fuel at the higher pressure to drive the water pump.

Another aspect concerns a fuel water separator system that includes a fuel pump configured to pump fuel. The fuel pump has a high pressure side and a suction side where the fuel has a pressure lower than at the high pressure side. A fuel water separator is configured to separate water from the fuel, and the fuel water separator is fluidly coupled to the suction side of the fuel pump. The fuel water separator has a pump portion with a drain opening through which the water is drained. A high pressure filter is fluidly coupled to the high pressure side of the fuel pump for filtering the fuel, and the high pressure filter has a top portion with an air vent passage configured to vent air from the high pressure filter. A venturi with an inlet port is fluidly coupled to the vent passage so that the fuel flow through the venturi is negligible during cold cranking of an engine. The venturi has an outlet port fluidly coupled to a remote storage location, and the venturi has an injection port fluidly coupled to the drain opening to pump the water from the pump portion of the fuel water separator when the fuel flows through the venturi.

A further aspect concerns a fuel pump system that includes a fuel water separator configured to separate water from fuel. The system includes a fuel pump configured to pump the fuel, and the fuel pump has a suction port fluidly coupled to the fuel water separator and a high pressure port where the fuel has a pressure higher than at the suction port. A jet pump includes an inlet port fluidly coupled to the high pressure port. The jet pump further includes an injection port fluidly coupled to the fuel water separator to receive water from the fuel water separator. A jet orifice is disposed between the inlet port and the injection port. The jet orifice is sized smaller than the inlet port to create a jet of the fuel for drawing the water through the injection port. The jet pump further includes a discharge port from which a mixture of the fuel from the jet and the water is discharged. A storage container is fluidly coupled to the discharge port of the jet pump for storing the water from the jet pump.

Still yet another aspect concerns a fuel water separator system. The system includes means for separating water from fuel and means for increasing pressure of the fuel from the means for separating the water from the fuel. The system further includes means for pumping the water from the means for separating the water from the fuel. The means for pumping the water is driven by the fuel with increased pressure from the means for increasing the pressure of the fuel.

Further forms, objects, features, aspects, benefits, advantages, and embodiments of the present invention shall become apparent from the detailed description and drawings provided herewith.

DESCRIPTION OF SELECTED EMBODIMENTS

Figure 1:
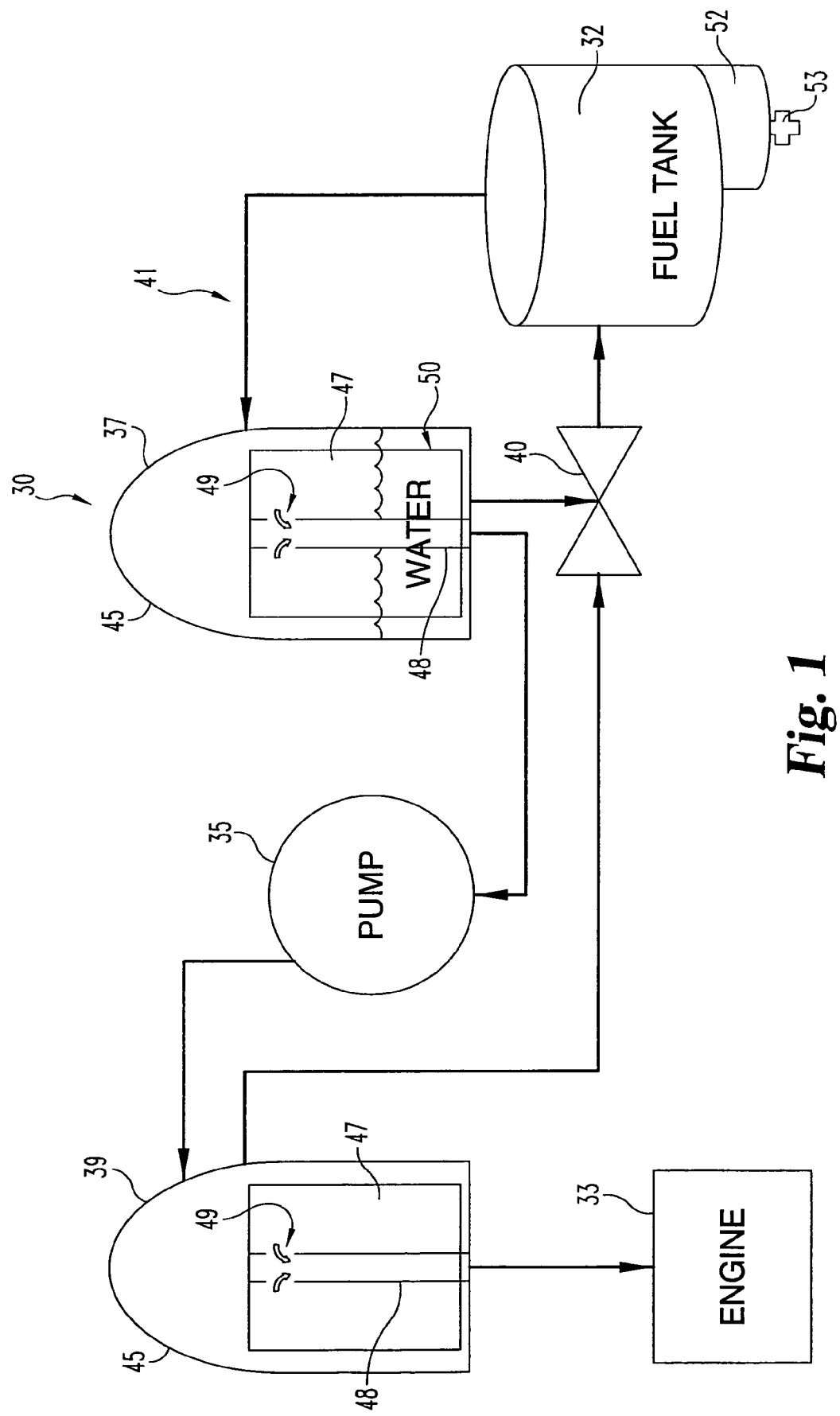
FIG. 1 is a diagrammatic view of a fuel water separator system according to one embodiment of the present invention.

For the purpose of promoting an understanding of the principles of the invention, reference will now be made to the embodiments illustrated in the drawings and specific language will be used to describe the same. It is understood that the specific language and figures are not intended to limit the scope of the invention only to the illustrated embodiment. It is also understood that alterations or modifications to the invention or further application of the principles of the invention are contemplated as would occur to persons of ordinary skill in the art to which the invention relates. One embodiment of the invention is shown in great detail, although it will be apparent to those skilled in the relevant art that some features that are not relevant to the present invention may not be shown for the sake of clarity.

A fuel water separator system 30 according to one embodiment, among others, of the present invention will now be described with reference to FIG. 1. As shown, the system 30 includes a fuel tank 32 that supplies fuel to an engine 33. In the illustrated embodiment, the engine 33 is an internal combustion engine and the fuel is diesel fuel, but it should be appreciated that the system 30 can be adapted for use with other types of engines and fuels. A fuel pump 35 is used to pump fluid from the fuel tank 32 to the engine 33. It should be appreciated that fuel pump 35 can include fuel pumps of the type as generally known to those skilled in the art. At the suction or low pressure side (port) of the fuel pump 35, a suction fuel water separator or filter 37 is coupled between the fuel tank 32 and the pump 35 to separate water and other contaminants from the fuel. Between the engine 33 and the fuel pump 35, a pressure side filter 39 is connected to the high pressure side (port) of the fuel pump 35 for performing a second stage of finer filtering to remove contaminants from the fuel. The system 30 further includes a self powered water pump 40 for draining water from the suction fuel water separator 37 into the fuel tank 32. The self powered water pump 40 receives its power through the pressurized fuel from the pressure side of the fuel pump 35. In the illustrated embodiment, the water pump 40 is of a type of pump that does not include moving parts, thereby improving the overall reliability of the system 30. Specifically, in one embodiment, the water pump 40 includes a venturi type pump. For simplicity and ease of reading, the following detailed description will refer to the self powered water pump 40 as being a venturi type pump. However, the venturi pump can be replaced by the other pumping devices, with similar effect. For example, it is envisioned that the water pump 40 can include other types of pumps such as a jet pump, nozzle, orifice and/or variations of theses style of pumps, to name a few. Referring to FIG. 1, the components of the system 30 are interconnected through a series of lines 41, such as fuel lines, drainage lines, tubing, piping and the like. Nonetheless, it should be appreciated that the components of the system 30 can be connected in other manners.

In the illustrated embodiment, each filter 37, 39 includes a housing 45 that encloses a filter media 47 for filtering the fuel and a standpipe 48 from which the fuel is discharged. It nevertheless should be appreciated that the filters 37, 39 can be configured in other manners. As depicted, the standpipe 48 has an inlet 49 into which fuel from the filter media 47 is received. With reference to FIG. 1, the suction fuel water separator 37 receives fuel from the fuel tank 32, and the filter media 47 inside the suction fuel water separator 37 separates water and other contaminants from the fuel. The water in the suction fuel water separator 37 collects in a pump area 50, which is usually the lowest area of the suction fuel water separator 37. The suction from the fuel pump 35 draws the filtered fuel through the filter media 47 and into the inlet 49 of the standpipe 48 of suction fuel water separator 37. From the suction fuel water separator 37, the fuel is pumped to a higher pressure into the pressure side filter 39, where the fuel is filtered via filter media 47 and discharged via the standpipe 48 to the engine 33 or some other component in between, such as a high pressure pump.

In the fuel water separator system 30 of FIG. 1, a relatively small flow of the fuel that has been pressurized by the fuel pump 35 is diverted through to the venturi pump 40. The suction created by the pressurized fuel flowing through the venturi pump 40 is used to draw the water from the pump 50 of the suction pump 37 and into the venturi flow. The water-fuel mixture from the venturi pump 40 is then discharged into the fuel tank 32, where the water settles out of the fuel. In the illustrated embodiment, the pressurized fuel for the venturi pump 40 is tapped from the pressure side filter 39, but it should be appreciated that the pressurized fuel can be supplied from other locations along the pressure side of the fuel pump 35. For example, in other embodiments, the return fuel flow from injectors in the engine 33, pumps and the like may be used for activating the venturi 40, if sufficient pressure and flow are available. In one form, when the pressurized fuel flow is tapped from the housing 45 of the pressure side filter 39, the fuel is tapped from a point high on the housing 45, possibly at the level of the inlet 49 of the standpipe 48 or higher. Tapping at such a high location on the pressure side filter 39 ensures that the fuel in the pressure side filter 39 does not drain slowly back into to the fuel tank 32 when the engine 33 is turned off. Alternatively or additionally, a check valve or other types of flow direction control valves with an appropriate cracking pressure can be positioned prior to or after the venturi pump 40 to minimize drainage back into the fuel tank 32. This check valve can also serve to cut off flow through the venturi 40 during cold cranking of the engine 33, during which the fuel pump 35 is at its least efficient speed.

As mentioned before, the venturi pump 40 discharges a mixture of water and fuel into the fuel tank 32. In the fuel tank 32, the fuel floats to the top of the fuel tank and the water sinks to the bottom. In the illustrated embodiment, the fuel tank 32 incorporates a drainage portion 52 with a drainage valve 53 for draining water from the fuel tank 32. During routine maintenance, such as when the filters 37, 39 are being replaced, the mechanic can drain and dispose of the water from the fuel tank 32. When compared to the suction fuel water separator 37, the fuel tank 32 provides a relatively large container in which to store the separated water. Usually, the fuel tank 32 is located at a position that easily accessible to permit drainage of the water and other contaminants. In another embodiment, the system 30 incorporates a settling tank that is coupled between the venturi 40 and the fuel tank 32. In this particular embodiment, the fuel floats to the top of the settling tank, and the top of the settling tank has a drain from which the fuel in the settling tank can drain back into the fuel tank 32. Other types of collection tanks in further embodiments can be used to remotely store the water and allow easy drainage of the water.

With the above described system 30, fuel water separation is conducted on the suction side of the fuel pump 35. As mentioned previously, filter media 47 typically operates in an optimal fashion when separating water from the fuel at the suction side of the fuel pump 35, as opposed to the pressure side. The illustrated system 30 further reduces the need of routine water drainage that is typically conducted by the machine operator at the beginning of each work day in order to reduce the risk of damage to the fuel system. Instead, the fuel water separation system 30 allows the water to be drained during routine maintenance. As opposed to the location of fuel filters, which are sometimes located under or over the cab of a truck, water can be drained from a remote location that is more convenient for mechanics. As noted before, the fuel water separation system 30 permits the use of larger storage containers for the water as compared to fuel filters. Furthermore, the fuel water separator system of FIG. 1 maintains a closed system; that is, the contaminated water is not reintroduced to the engine 33 and is stored until the water and other contaminants can be disposed of in environmentally friendly manner. Moreover, the system 30 eliminates the need for less reliable electrical components, such as electrical sensors and drainage valves, although such components can be incorporated into the system 30, if so desired.

Figure 2:
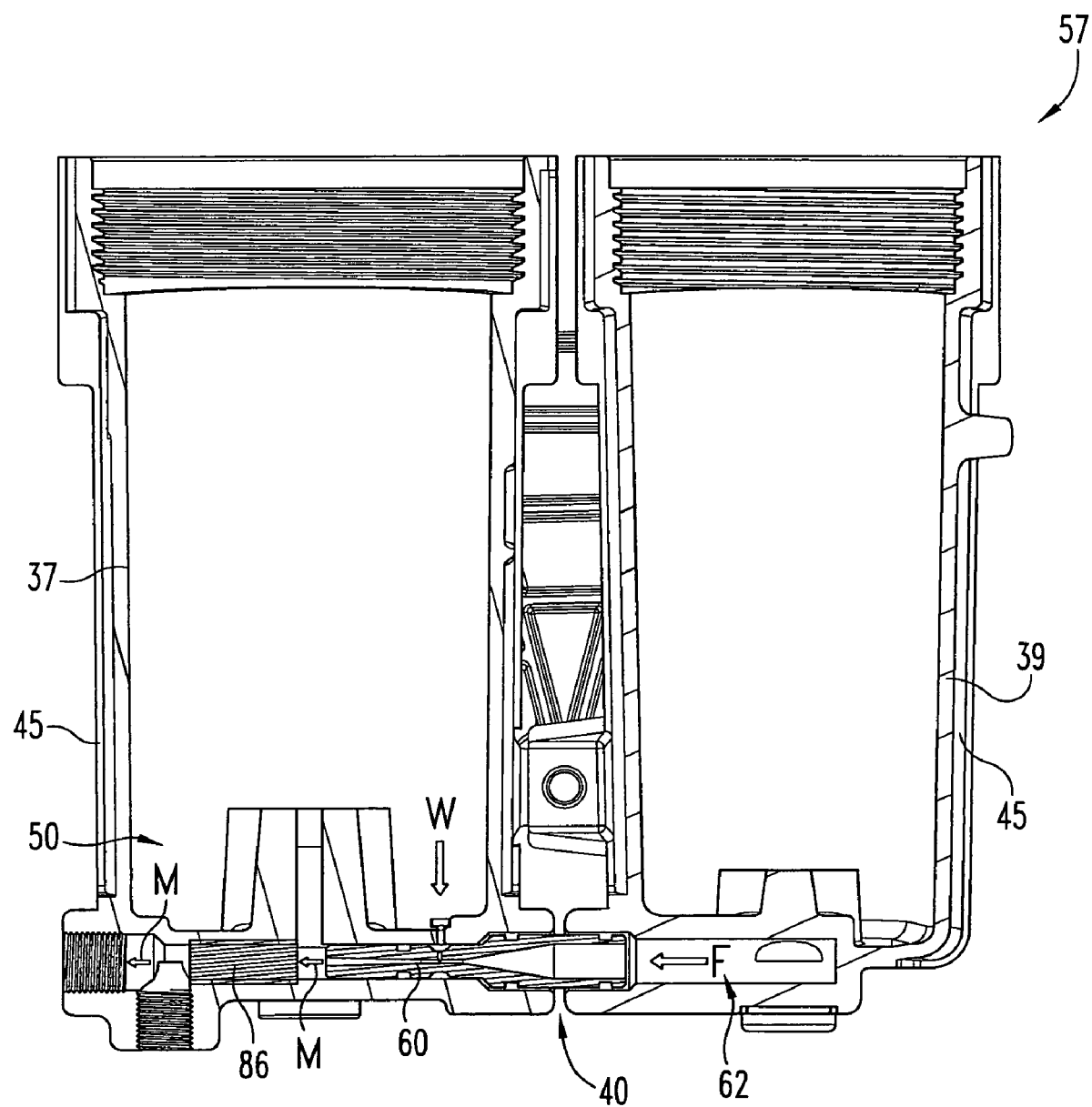
FIG. 2 is a cross sectional view of a filter system according to one embodiment with a venturi pump that can be integrated into the FIG. 1 system.

A filter system 57 according to one embodiment, which can be used in the fuel water separator system 30 of FIG. 1, is illustrated in FIG. 2. In the filter system 57, the housings 45 of the suction fuel water separator 37 and the pressure side filter 39 are connected together. For the sake of clarity, the filter media 47 and standpipes 48 of the filters 37, 39 are not shown, but it should be appreciated that the filters 37, 39 include these as well as other components. As depicted, the self powered water pump 40 in the filter system 57 of FIG. 2 includes a venturi pump 60 for pumping water from the suction fuel water separator 37. The housing 45 of the pressure side filter 39 defines a return port or passage 62 that supplies the pressurized fuel to the venturi 60. The return port 62 is further used to vent air from the pressure side filter 39 and return fuel to the fuel tank 32.

Figure 3:
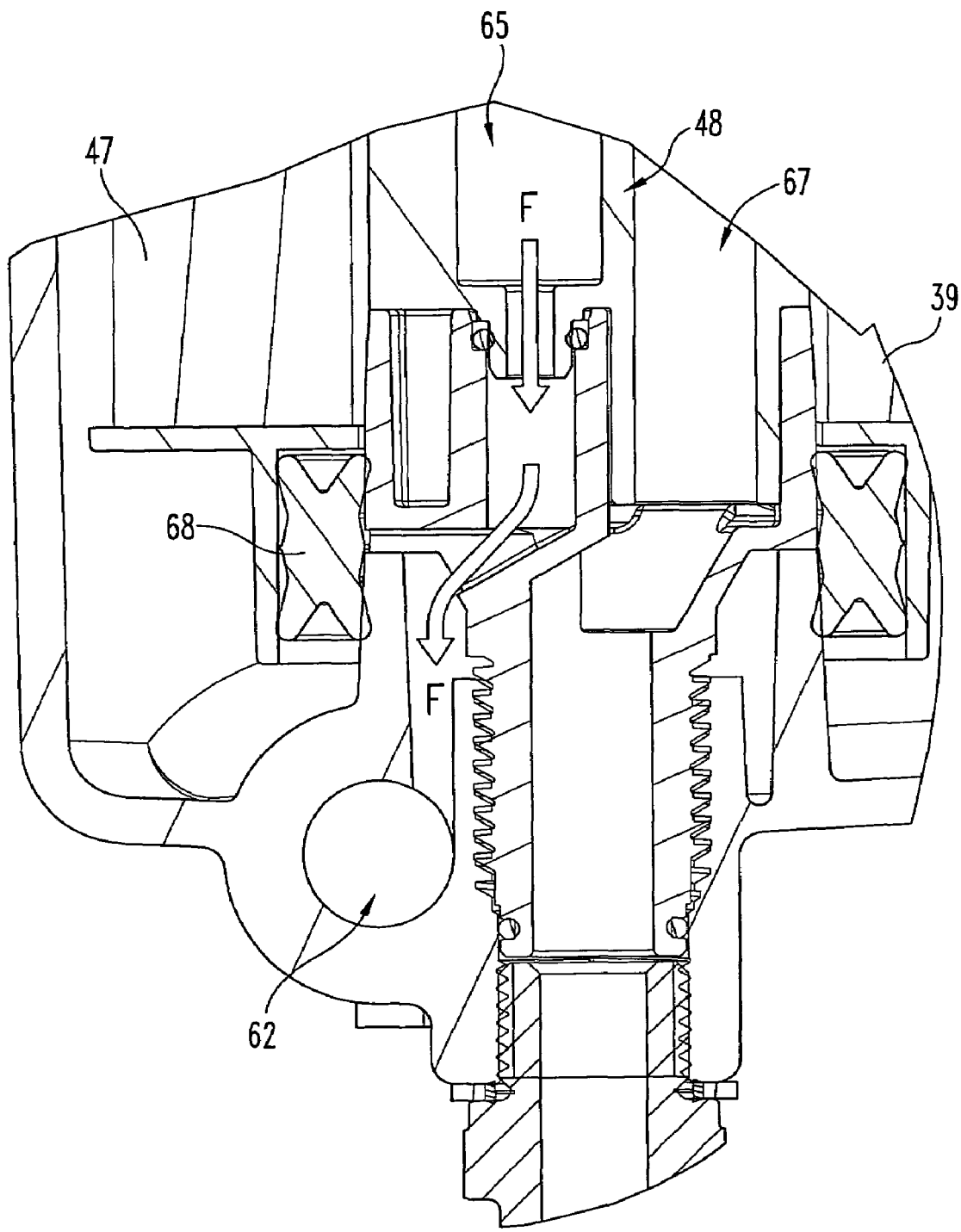
FIG. 3 is an enlarged cross sectional view of a return port in the FIG. 2 filter system.

Referring to FIG. 3, the filter system 57 takes advantage of the return port 62, which is already needed to vent air from the pressure side filter 39, by housing and driving the venturi 60, without the costs associated with additional ports and fittings, thereby keeping cost of the system 57 low. The standpipe 48 in the pressure side filter 39 defines two passages, a vent passage 65 for venting air and a fuel discharge passage 67 for discharging filtered fuel from the pressure side filter 39 to the engine 33 or some other component. Serving a dual purpose, the venturi pump 60 draws pressurized fuel near the top of the housing 45 of the pressure side filter 39. Any air trapped at the top of the housing 45 is vented back to the fuel tank 32, through the venturi pump 60, and as mentioned before, the venturi pump 60 also utilizes the pressurized fuel to draw water from the suction fuel water separator 37. It is contemplated, however, that the air vent can be positioned at different locations and/or the filter system 57 can be configured differently in other embodiments. As illustrated, the vent passage 65 is connected to the return port 62 so that air can be vented into the fuel tank 32, and the inlet 49 for the vent passage 65 is located at a relatively high location within the pressure side filter 39 so that air can be vented. Once the air is vented, fuel flows through the vent passage 65 and into the return port 62, as indicated by arrow F. In FIG. 3, a seal 68 is used to seal between the filter media 47 and the standpipe 48 so as to minimize leakage.

Figure 4:
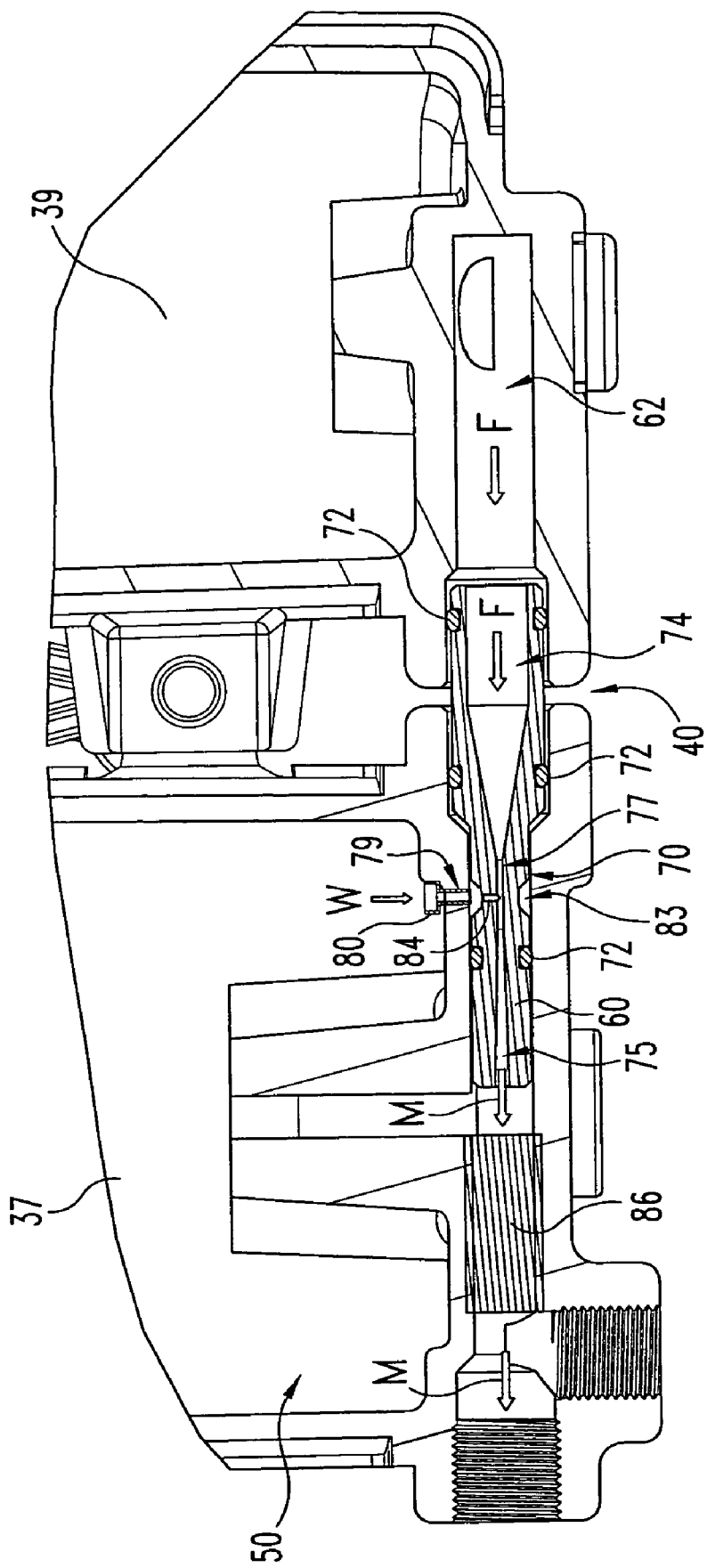
FIG. 4 is an enlarged cross sectional view of the FIG. 2 filter system around the venturi pump.

With reference to FIG. 4, the housing 45 of the suction fuel water separator 37 likewise defines a return port 70 in which a portion of the venturi pump 60 is received. Seals 72 are disposed around the venturi pump 60 so as to minimize leakage from the filter system 57. In the illustrated embodiment, the seals 72 include o-ring seals, but it should be appreciated that other types of seals can be used. The venturi pump 60 has tapered intake 74 and discharge 75 ports along with a narrow throat portion 77 located between the ports 74, 75. Near the throat portion 77 of the venturi pump 60, the suction pump 37 has a drain opening 79 through which water is drawn from the pump 50 of the suction pump 37, as is indicated by arrow W. In one form, the suction pump 37 has a strainer 80 covering the drain opening 79 so as to minimize the chance of the venturi pump 60 from being clogged with particulate matter in the water. During routine maintenance, the strainer 80 can be cleaned or replaced with a new one. It is envisioned that in other embodiments the strainer 80 can be optional so as to not be incorporated into the suction fuel water separator 37. Around the throat portion 77, the venturi pump 60 has a drainage groove 83 and an injection port 84 through which water is drawn from the drain opening 79 into the venturi pump 60. As shown, the intake 74 and discharge 75 ports taper towards the throat portion 77. The narrow throat portion 77 acts as a constriction in the middle of the venturi pump 60 that causes an increase in the velocity of flow of fluid and a corresponding decrease in fluid pressure, which is used to create suction at the injection port 84. As depicted with arrow M in FIG. 4, a mixture of the fuel and water is discharged from the discharge port 75. As noted above, the water is drawn into the venturi pump 60 and returned to the fuel or settling tank 32 where the water can be drained by a technician at a routine service interval, such as during a filter change or other maintenance.

The components in the filter system 57 are sized to draw water from the pump 50 at a rate that will keep the water drained so that the water does not reach a level where it could pass through the filter media 47. In one form, the filter system 57 is designed with the flow rate from the pressure side filter 39 that is sufficiently low so that the flow rate of fuel through the venturi pump 60 does not impact the performance of the fuel water separator system 30 or proper fuel delivery to the engine 33. It is not necessary for the venturi pump to remove water one-hundred percent (100%) of the time. The suction of in the fuel water separator system 30 can vary with engine operation, and may fluctuate to several times the nominal suction level. In the illustrated embodiment, the venturi pump 60 is sized so that the venturi pump 60 draws water from the pump 50 during enough of the engine operation so as to avoid water build up. However, the venturi pump 60 in selected embodiments can be configured to intentionally not work at the higher suction levels (i.e., at peak dynamic suction levels). A stagnation of water removal, or even a reverse flow can occur at the highest suction levels, possibly allowing fuel into the suction fuel water separator 37 through the drain opening 79. This is usually not a problem for system performance though. Since the water is drawn from the dirty side of the suction fuel water separator 37, it does not matter if the venturi pump 60 occasionally allowed a reverse flow of fuel into the suction fuel water separator 37 via the drainage opening 79 because fuel from the reverse flow is simply filtered again. Moreover, this occasional reverse flow is acceptable as long as a positive flow of water occurs during enough of the operating cycle to maintain the water in the suction fuel water separator 37 below a safe level. The above-described system configuration can allow greater flexibility of the design and manufacturing of the venturi pump 60 and related components. For example, lower flow rates can be accommodated for driving the venturi pump 60, or larger throat diameters in the venturi pump 60 can be used to ease manufacturing. The flow of fuel from the integrated air vent in the pressure side filter 39 generates enough suction in the venturi pump 60 to overcome the vacuum in the suction filter 38. For instance, the flow of fuel from the pressure side filter 39 in one embodiment is twelve gallons per hour (12 gph), which is sufficient to overcome the vacuum in suction fuel water separator 37 (which approximately ranges from −6" of Hg nominal to a peak of −20" of Hg). Nevertheless, it should be realized that different operational parameters can be used in other embodiments.

In the illustrated embodiment, a direction control or back flow valve 86, such as a check valve, is positioned in the discharge port 75, downstream from the venturi pump 60, and the direction control valve 86 has an appropriate cracking pressure so as to minimize back flow fuel into the fuel tank 32. As should be appreciated valve 86 can be positioned at other locations, such as in the return port 62 in the pressure side filter 39, and the valve 86 can include direction control valves of the type as generally known to those skilled in the art, such as check valves and/or umbrella valves, to name a few. As noted before, the direction control valve 86 can also server or cut off flow through the venturi 60 during cold cranking of the engine 33, when the fuel pump 35 is operating at its least efficient speed. Typically, the rotations per minute (rpm) of the fuel pump 35 during cold cranking is very low, say around one-hundred (100) rpm. At this range, many types of fuel pumps 35 are inefficient so that it is desirable to not divert fuel from the engine 33, until the engine starts and the fuel system is pressurized. The cracking pressure for the direction control valve 86 is set so that the valve 86 opens when the engine starts and the pressure of the fuel system is established. In one embodiment, the cracking pressure is five pounds per square inch gauge (5 psig), but it should be recognized that the cracking pressure can be different in other embodiments. Moreover, it is contemplated that other embodiments do not incorporate the direction control valve 86. For example, in the illustrated embodiment, the direction control valve 86 is likely not needed because the fuel flow that drives the venturi pump 60 comes from the air vent in the pressure side filter 39. The air vent in the pressure side filter 39 is designed to restrict the flow of fuel so that the flow of fuel during cold cranking is negligible.

It is contemplated that some or all of the components in the filter system 57 as well in other embodiments can be integrated to form a single unit. For instance, the venturi pump 60 and related passageways can be formed directly into the housing 45 of the suction filter 37. It is further envisioned that a water in fuel sensor can be installed into the filter system 57 of FIG. 2 or systems in other embodiments in order to warn in the event of a system failure or the sudden ingestion of a very large quantity of water, perhaps from a bad batch of fuel.

Figure 5:
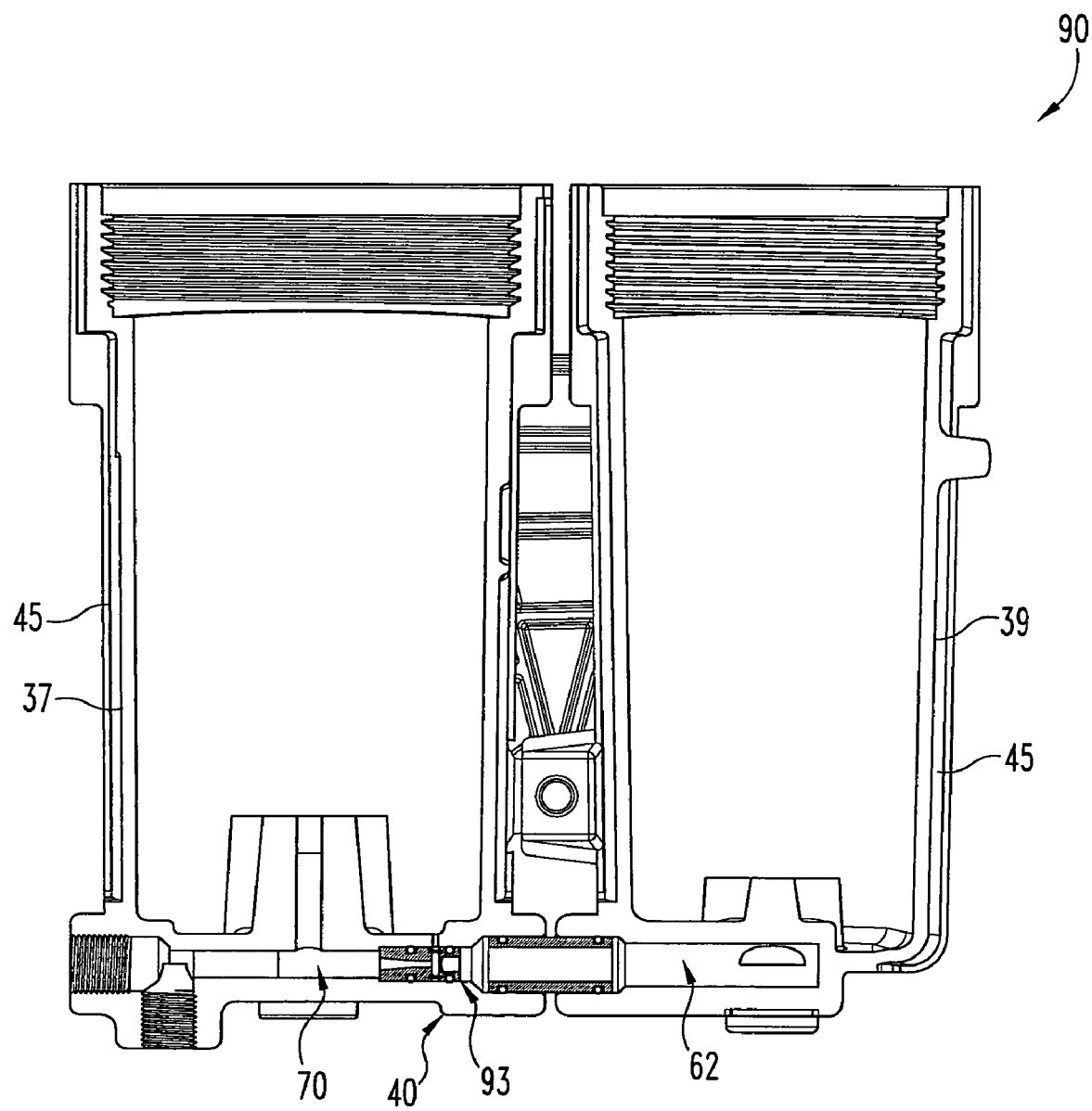
FIG. 5 is a cross sectional view of a filter system according to another embodiment with a jet pump that can be integrated into the FIG. 1 system.
Figure 6:
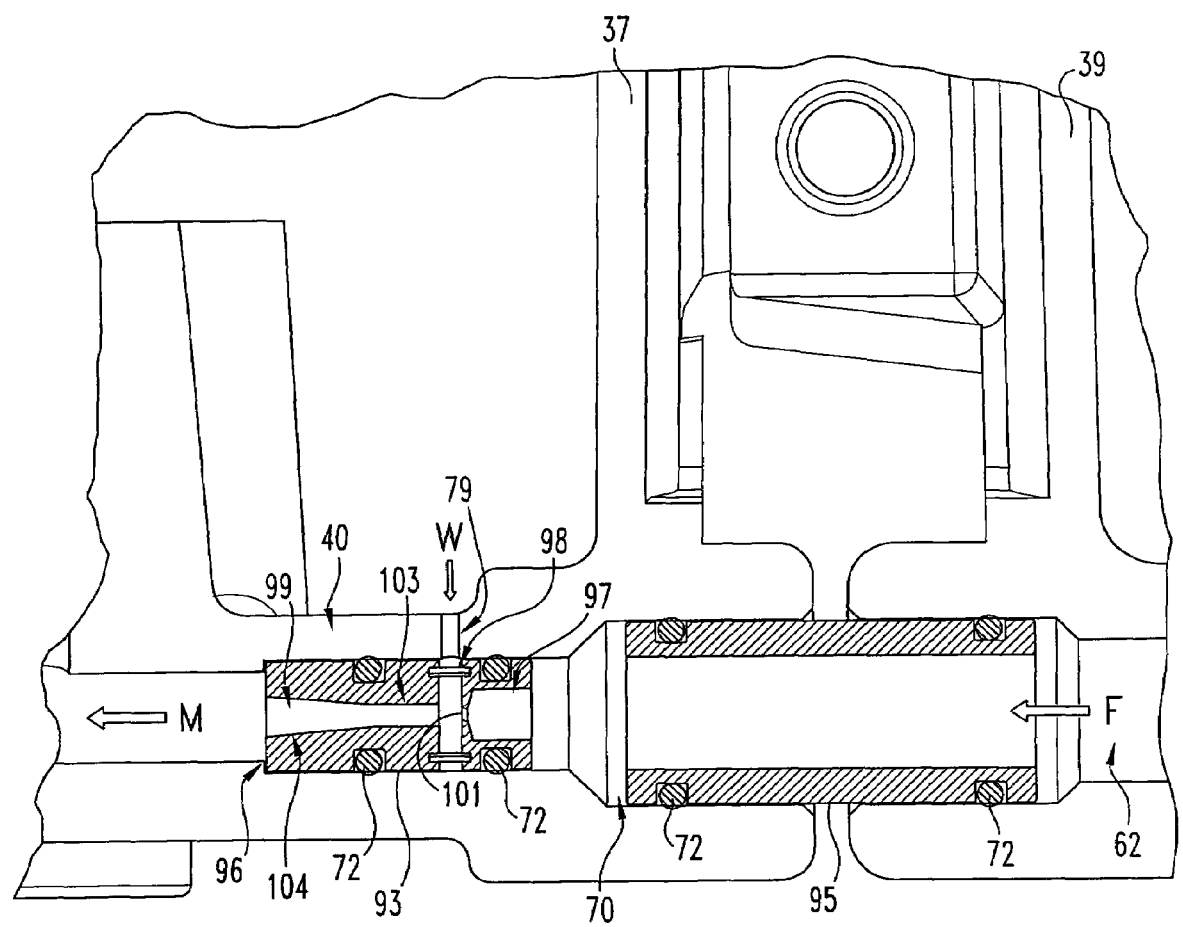
FIG. 6 is an enlarged cross sectional view of the FIG. 5 filter system around the jet pump.

As mentioned earlier, the self powered water pump 40 in FIG. 1 can also include a jet pump for pumping water from the suction fuel water separator 37. For example, as illustrated in FIGS. 5 and 6, a filter system 90 according to another embodiment includes a jet pump 93 for use in the fuel water separator system 30 of FIG. 1. The filter system 90 includes the suction fuel water separator 37 and the pressure side filter 39 of the type as described above. As should be appreciated from reviewing the drawings, the filter system 90 in FIG. 5 shares a number of components in common with the filter system 57 described in reference to FIG. 2. For example, the filter system 90 in FIG. 5 incorporates the air venting system of the type illustrated in FIG. 3. For the sake of clarity as well as brevity, these common features will not be again described in great detail below, but rather, reference is made to the previous discussion of these features.

Referring to FIG. 6, a hollow connector 95 connects the return port 62 of the pressure side filter 39 to the return port 70 in the suction fuel water separator 37. As shown, seals 72 are disposed around the connector 95 in both return ports 62, 70 in order to minimize fuel leakage. The jet pump 93 is positioned downstream from the connector 95, in the return port 70 of the suction fuel water separator 37. To minimize leakage or bypassing of fuel around the jet pump 93, one or more seals 72 are disposed between the jet pump 93 and the return port 70. In the illustrated embodiment, the return port 70 in the suction fuel water separator 37 has a retention notch 96 that is used to position the jet pump 93 within the return port 70. However, it should be appreciated that the jet pump 93 can be retained in other manners. As shown in FIG. 6, the jet pump 93 includes an inlet port 97 in which fuel F from the pressure pump 35 is received, one or more injection ports 98 in which water W from the suction fuel water separator 37 is drawn, and an outlet port 99 from which the mixture M of fuel and water is discharged. The injection ports 98 in the jet pump 93 are positioned to receive water from the drainage opening 79 in the suction fuel water separator 37. Between the inlet port 97 and the injection port 98, the jet pump 93 has a jet orifice or nozzle 101 that is relatively small in size to create a jet of fuel that acts to create the motive pressure in the jet pump 93. As shown, the injection ports 98 are located downstream from the jet orifice 101, and the jet of fuel from the jet orifice 101 acts draw the water from the injection ports 98. In the illustrated embodiment, the outlet port 99 includes a mixing bore 103 that is connected to a diffuser 104 with angled walls. It should be recognized that the mixing bore 103 is sized larger than the jet orifice 101 so that a large flow of water can be drawn from the fuel water separator 37. In the mixing bore 103, the jet of fuel from the jet orifice 101 and the water from the injection ports 98 are mixed together and discharged via the diffuser 104. As depicted the injection ports 98 are larger in size as compared to a comparable venturi pump, thereby providing larger passage sizes for the dirty water, which in turn reduces the chance of clogging. Although the ports in the jet pump 93 was described as having single ports or orifices, it should be appreciated that the jet pump 93 can include multiple ports of the same type in other embodiments. Moreover, the jet pump 93 in other embodiments can be configured in other manners. For instance, the system 90 can incorporate a strainer of the type described above.

The filter system 90 in FIGS. 5 and 6 operates in a fashion similar to the systems described above. Pressurized fuel from the pressure side filter 39 is supplied to the jet pump 93, and a high velocity jet of fuel is formed at the jet orifice 101. Water that has been separated by the suction fuel water separator 37 is drawn via the jet from the injection ports 98. The mixture of fuel and water is then discharged from the outlet port 99 of the jet pump 93 and into the fuel tank 32, where the water settles from the fuel. The performance of the jet pump 93 according the illustrated embodiment has been analyzed over a broad range of pressures and flows. It has been discovered that the jet pump 93 performs well, giving higher water removal rates than a similarly sized venturi. In addition to providing better pumping performance, the jet pump 93 is less prone to back-flow over a large pressure/flow range. Due to this reduction in back-flow, the filter system 90 in FIG. 5 does not include a flow direction valve 86, but it is envisioned that other embodiments can include a flow direction valve 86.

Figure 7:
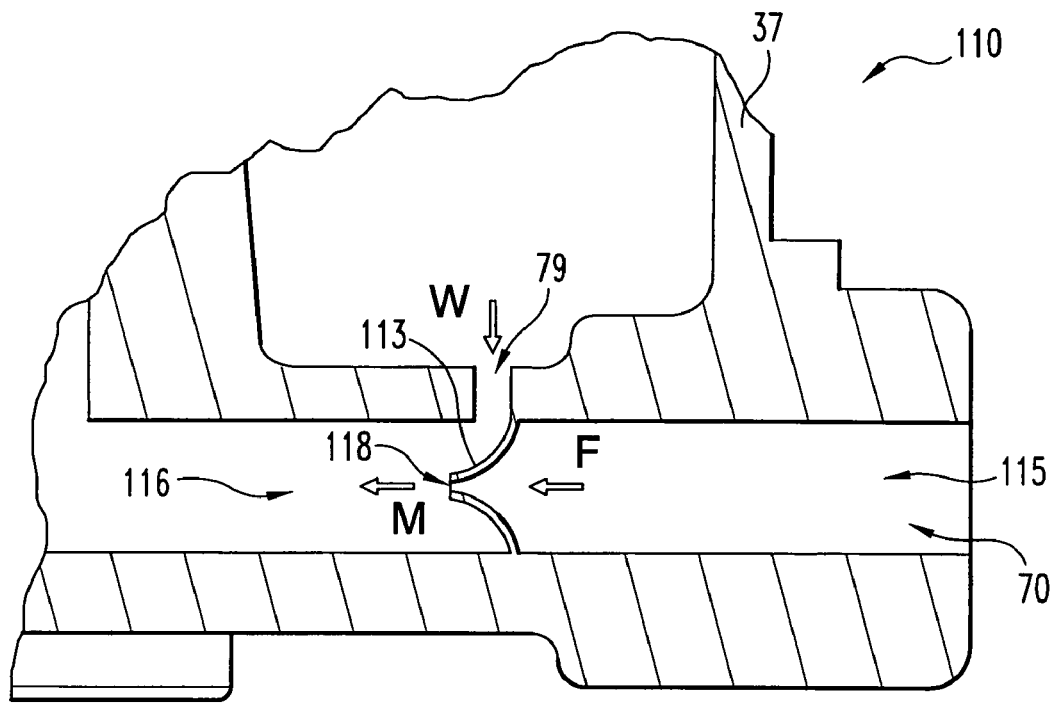
FIG. 7 is an enlarged cross sectional view of a filter system according to a further embodiment with a jet pump having another form.

It is contemplated that the jet pump can take on many forms. For instance, a filter system 110 in FIG. 7 includes a jet pump 113, with an alternate design, for use in the fuel water separator system 30 of FIG. 1. The filter system 110 includes the suction fuel water separator 37 and the pressure side filter 39 of the type as described above. As should be recognized from reviewing the drawings, the filter system 10 in FIG. 7 shares a number of components in common with the filter systems described above. For the sake of clarity as well as brevity, these common features will not be again described in great detail below, but rather, reference is made to the previous discussion of these features. Inside the return port 70, the jet pump 113 utilizes a common flow diameter (or size) at the inlet 115 and outlet 116 sides of the jet pump 113. The jet pump 113 in the illustrated embodiment has a horn or frustoconical shape with a jet orifice 118 sized to create a jet of fuel that provides the motive pressure for the jet pump 113. In FIG. 7, the jet pump 113 is a separate component that is secured inside the return port 70, but it is envisioned that the jet pump 113 can be secured in other manners. For instance, the jet pump 113 in other forms can be integrally formed inside the return port 70.

Figure 8:
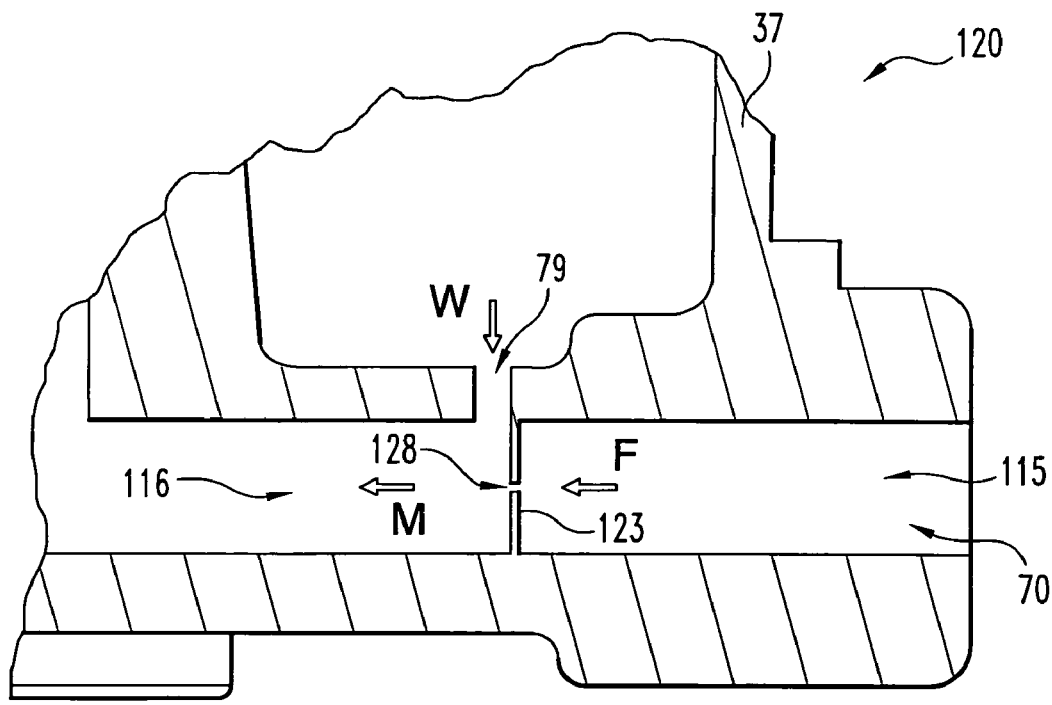
FIG. 8 is an enlarged cross sectional view of a filter system according to still yet another embodiment with a jet pump having an alternate design.

Like the previous examples, filter system 120 in FIG. 8 has a jet pump 123 with a common flow diameter (or size) at the inlet 115 and outlet 116 sides of the jet pump 123. As shown in FIG. 8, the jet pump 123 is disk shaped and has a jet orifice 128 sized to create a jet of fuel that provides the motive pressure for the jet pump 123. The jet pump 123 in the illustrated embodiment is integrally formed with the suction water filter 37, but it should be recognized that the jet pump 123 can be secured in other manners.

While the invention has been illustrated and described in detail in the drawings and foregoing description, the same is to be considered as illustrative and not restrictive in character. It should be understood that only the preferred embodiments have been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A fuel water separator system, comprising:
a fuel tank for storing fuel;
a fuel water separator fluidly coupled to the fuel tank for separating water from the fuel;
a fuel pump having a suction side that is fluidly coupled to the fuel water separator for pumping fuel from the fuel water separator, the fuel pump having a high pressure side where the fuel has a higher pressure than at the suction side;
a water pump integrated into the fuel water separator, the water pump fluidly coupled between the fuel water separator and the fuel tank for pumping the water from the fuel water separator into the fuel tank; and
a pressure filter fluidly coupled to the high pressure side of the fuel pump for filtering the fuel,
wherein the water pump is fluidly coupled to the high pressure side of the fuel pump at the pressure filter to receive the fuel at the higher pressure to drive the water pump.

2. The system of claim 1, wherein the water pump includes a venturi pump.

3. The system of claim 1, wherein the water pump includes a jet pump.

4. The system of claim 1, wherein the fuel tank includes a drain valve for draining the water from the fuel tank.

5. The system of claim 4, wherein the drain valve includes a manually operated type valve.

6. The system of claim 1, wherein the fuel water separator includes filter media for separating the water from the fuel.

7. The system of claim 1, further comprising a strainer disposed in the fuel water separator for filtering contaminants from the water before entry into the water pump.

8. The system of claim 1, wherein the water pump includes a back flow valve having a cracking pressure that minimizes back flow of the fuel.

9. The system of claim 8, wherein the back flow valve includes a check valve.

10. The system of claim 1, wherein
the pressure filter includes an air vent for venting air from the pressure filter; and the water pump is fluidly coupled to the air vent to receive the fuel at the higher pressure.

11. The system of claim 1, further comprising an engine fluidly coupled to the pressure filter.

12. The system of claim 1, further comprising a settling tank fluidly coupled between the water pump and the fuel tank for collecting the water.

13. A fuel water separator system, comprising:
a fuel pump configured to pump fuel, the fuel pump having a high pressure side and a suction side where the fuel has a pressure lower than at the high pressure side;
a fuel water separator configured to separate water from the fuel, the fuel water separator being fluidly coupled to the suction side of the fuel pump, the fuel water separator having a pump portion with a drain opening through which the water is drained;
a high pressure filter fluidly coupled to the high pressure side of the fuel pump for filtering the fuel, the high pressure filter having a top portion with an air vent passage configured to vent air from the high pressure filter; and
a venturi with an inlet port fluidly coupled to the vent passage so that the fuel flow through the venturi is negligible during cold cranking of an engine and an outlet port fluidly coupled to a remote storage location, the venturi having an injection port fluidly coupled to the drain opening to pump the water from the pump portion of the fuel water separator when the fuel flows through the venturi.

14. The system of claim 13, wherein the inlet port and the outlet port taper toward a narrow throat portion for creating suction at the injection port.

15. A fuel pump system, comprising:
a fuel water separator configured to separate water from fuel;
a fuel pump configured to pump the fuel, the fuel pump having a suction port fluidly coupled to the fuel water separator and a high pressure port where the fuel has a pressure higher than at the suction port;
a jet pump including
an inlet port fluidly coupled to the high pressure port,
an injection port fluidly coupled to the fuel water separator to receive water from the fuel water separator,
a jet orifice disposed between the inlet port and the injection port, the jet orifice being sized smaller than the inlet port to create a jet of the fuel for drawing the water through the injection port, and
a discharge port from which a mixture of the fuel from the jet and the water is discharged;

a storage container fluidly coupled to the discharge port of the jet pump for storing the water from the jet pump; and a filter fluidly coupled to the high pressure port of the fuel pump to filter the fuel, wherein the inlet port of the jet pump is fluidly coupled to the high pressure port through the filter.

16. The system of claim 15, wherein the storage container includes a fuel tank.

17. A fuel water separator system, comprising:

means for separating water from fuel;

means for increasing pressure of the fuel from said means for separating the water from the fuel;

means for pumping the water from said means for separating the water from the fuel, wherein said means for pumping the water is driven by the fuel with increased pressure from said means for increasing the pressure of the fuel;

means for housing supporting the means for separating water from fuel and the means for pumping water, wherein the means for pumping water is adjacent to the means for separating water from fuel, and wherein the means for pumping receives the water directly from the means for separating water from fuel;

means for storing the water from said means for pumping the water; and means for filtering the fuel from said means for increasing the pressure of the fuel, wherein said means for pumping the water receives the fuel from said means for filtering the fuel.

18. The system of claim 17, wherein:

said means for separating the water from the fuel includes a fuel water separator;

said means for increasing the pressure of the fuel includes a fuel pump;

said means for pumping the water includes a jet pump;

said means for storing the water includes a fuel tank; and said means for filtering the fuel includes a high pressure filter.

* * * * *